US011682785B1

(12) United States Patent
Hammad et al.

(10) Patent No.: US 11,682,785 B1
(45) Date of Patent: Jun. 20, 2023

(54) $CO_2$ BASED AND HYDROGEN BASED COMPOUNDS FOR REDOX FLOW BATTERY

(71) Applicant: Saudi Arabian Oil Company, Dhahran (SA)

(72) Inventors: Ahmad D. Hammad, Dhahran (SA); Issam T. Amr, Dhahran (SA); Wajdi Issam Al Sadat, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/577,569

(22) Filed: Jan. 18, 2022

(51) Int. Cl.
*H01M 8/18* (2006.01)
*H01M 4/98* (2006.01)
*H01M 4/96* (2006.01)
*H01M 4/86* (2006.01)

(52) U.S. Cl.
CPC ............ *H01M 8/188* (2013.01); *H01M 4/96* (2013.01); *H01M 4/98* (2013.01); *H01M 2004/8684* (2013.01); *H01M 2004/8689* (2013.01)

(58) Field of Classification Search
CPC ........... H01M 8/188; H01M 4/96; H01M 4/98
See application file for complete search history.

(56) References Cited

U.S. PATENT DOCUMENTS

| 11,050,076 | B1 | 6/2021 | Wang et al. |
| 2022/0173422 | A1* | 6/2022 | Kucernak ............ H01M 8/188 |

FOREIGN PATENT DOCUMENTS

| KR | 20210019503 | * | 2/2021 | .......... H01M 10/054 |
| WO | WO 2017004705 | | 1/2017 | |

OTHER PUBLICATIONS

Sadakiyo et al., "Electrochemical Production of Glycolic Acid from Oxalic Acid Using a Polymer Electrolyte Alcohol Electrosynthesis Cell Containing a Porous TiO2 Catalyst," Scientific Reports, Dec. 2017, 9 pages.
Sanchez-Diez at al., "Redox flow batteries: Status and perspective towards sustainable stationary energy storage," Journal of Power Sources, 2021, 23 pages.

\* cited by examiner

*Primary Examiner* — Karie O'Neill Apicella
(74) *Attorney, Agent, or Firm* — Fish & Richardson P.C.

(57) ABSTRACT

Flow cell batteries and methods of producing an electric current are provided. In some implementations, a flow cell battery includes an electrochemical cell including an ion exchange membrane, an anode current collector, and a cathode current collector. The space between the ion exchange membrane and the anode current collector forms a first channel and the space between the ion exchange membrane and the cathode current collector forms a second channel. The ion exchange membrane is configured to allow ions to pass between the first and second channel. The battery includes a first tank configured to flow an anolyte through the first channel, wherein the anolyte is hydrogen gas. The battery includes a second tank configured to flow a catholyte through the second channel, wherein the catholyte is a compound that can be reversibly hydrogenated and dehydrogenated. The flow cell battery can be used to generate electric current.

15 Claims, 4 Drawing Sheets

200

$CO_2$ BASED AND HYDROGEN BASED COMPOUNDS FOR REDOX FLOW BATTERY

TECHNICAL FIELD

This disclosure relates to flow batteries.

BACKGROUND

Energy storage is currently one of the major challenges in the deployment of renewable energy resources and the improvement of the electrical grid efficiency. Flow batteries are among the most promising storage options and have the potential to be cheaper and more flexible than other competitors. A flow battery is an energy storage technology that stores electrical energy as chemical energy in flowing solutions, and converts and releases it in a controlled manner when required. It is worth noting that the design of a flow battery allows for the separation between power and energy capacity that keeps the cost low for large scale application and also, facilitates matching with various loads/applications.

SUMMARY

This disclosure describes a flow cell battery.

In some implementations, a flow cell battery includes an electrochemical cell. The electrochemical cell includes an ion exchange membrane, an anode current collector, and a cathode current collector. The space between the ion exchange membrane and the anode current collector forms a first channel. The space between the ion exchange membrane and the cathode current collector forms a second channel. The ion exchange membrane is configured to allow ions to pass between the first channel and the second channel. The flow cell battery includes a first tank configured to flow an anolyte through the first channel, wherein the anolyte includes hydrogen gas. The flow cell battery includes a second tank configured to flow a catholyte through the second channel, wherein the catholyte includes a compound that can be reversibly hydrogenated and dehydrogenated.

In some implementations, a method of producing electric current includes flowing an anolyte through a first channel in an electrochemical cell. The first channel is formed in the space between an anode current collector and an ion exchange membrane. The anolyte includes hydrogen gas. The method includes flowing a catholyte through a second channel in the electrochemical cell. The second channel is formed in the space between a cathode current collector and the ion exchange membrane. The first channel and the second channel are separated by an ion exchange membrane. The catholyte includes a compound that can be reversibly hydrogenated. The method includes flowing ions through the ion exchange membrane to oxidize the anolyte and reduce the catholyte; and generating an electric current between the anode current collector and the cathode current collector.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Described herein is a flow battery. In a flow battery, electrolytes are stored in two tanks and a separately pumped from the tanks to an electrochemical cell. In the electrochemical cell, the electrolytes are put in "contact" through an ion exchange membrane. The ion exchange membrane allows protons to pass through when the battery is charged or discharged. During discharge (energy release) one electrolyte is oxidized and supplies electrons to the anode electrode, and a second electrolyte is reduced and receives electrons from the cathode electrode. In some implementations, the electrodes are carbon-based electrodes. The two electrodes can be connected to an external electrical circuit with a load. Alternatively or in conjunction, a power supply can supply power to the flow battery and reverse the chemical reactions, regenerating the battery.

Currently, the most common commercially available flow batteries are all-vanadium flow batteries. However, the high cost of vanadium flow batteries hinders direct implementation. Several techno-economic analyses have shown that the flow battery system overall cost has to drop almost 50% to make the technology viable. Cost break-down analyses have also revealed that the cost of a vanadium electrolyte exceeds 30% of the overall cost. Accordingly, lower-cost batteries are desirable.

Provided in this disclosure, in part, is a flow cell battery that includes electrolytes that do not degrade during charging and discharging, and which has improved performance and efficiency compared to other types of flow cell batteries.

Figure 1:
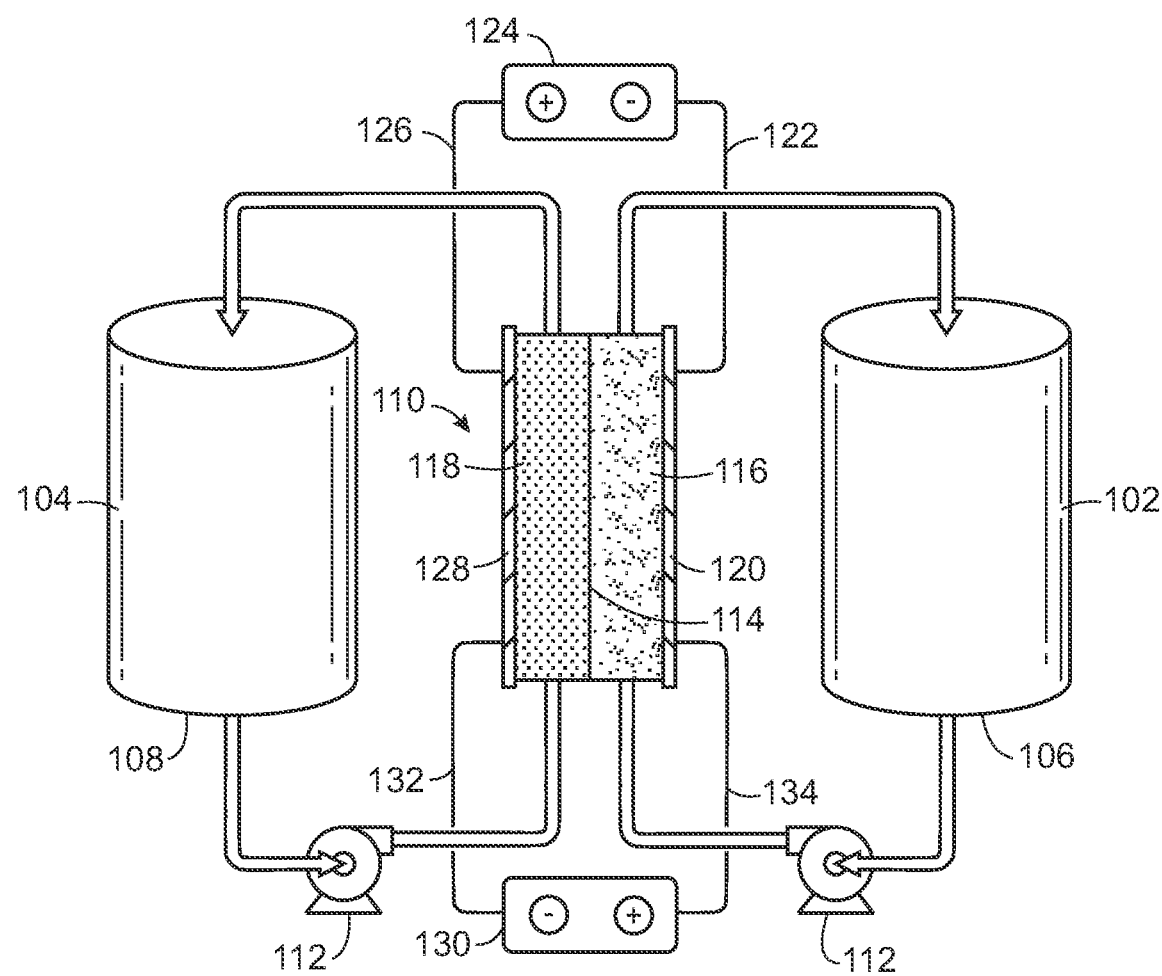
FIG. 1 shows an example schematic of a flow battery using two electrolytes.

FIG. 1 is an example schematic of a flow battery 100 using two electrolytes. In the flow battery 100, the energy is stored in electrolytes 102 and 104, which are termed anolyte 102 and catholyte 104, herein. The electrolytes 102 and 104 are stored in tanks 106 and 108 and are separately pumped from the tanks 106 and 108 to an electrochemical cell 110 by dedicated pumps 112.

In some embodiments, an ion exchange membrane 114 is used in the electrochemical cell 110. The ion exchange membrane 114 separates the electrolytes 102 and 104 to prevent energy loss by short-circuiting, while allowing protons or other ions, to pass between the sides during charge and discharge cycles.

As the electrolytes 102 and 104 are pumped through the electrochemical cell 110, they pass through channels 116 and 118. The channels 116 and 118 can include a porous electrode material, such as felt, or Rainey nickel, among others, to allow ions and electrons to flow between the electrolytes 102 and 104.

During the production of power, the anolyte 102 is oxidized, losing electrons to the anode current collector 120. The electrons are transferred by a line 122 to a load 124. After powering the load 124, the electrons are returned to the electrochemical cell 110 by another line 126. The electrons reenter the electrochemical cell 110 from the cathode current collector 128, reducing the catholyte 104.

The anolyte 102 and catholyte 104 are regenerated during a charging cycle when a power source 130 removes electrons from the cathode current collector 128 through a line 132, oxidizing the catholyte 104 to its initial state. The electrons are provided to the anode current collector 120 from the power source 130 through another line 134, reducing the anolyte 102 to its initial state.

In some implementations, the catholyte can be a compound that is reversibly hydrogenated and dehydrogenated. For example, the catholyte can include an alkane that can be dehydrogenated to an alkene, a saturated ring that can be dehydrogenated to an unsaturated ring, or an oxalate or oxalate-containing compound. In some implementations, the catholyte can be $CO_2$, a $CO_2$-containing compound, or a carboxylate-containing compound. In some implementations, the catholyte 104 can be oxalic acid (OA), HOOC—$CH_2OH$. The anolyte 102 can include hydrogen gas ($H_2$) or any $H_2$-based compounds. Further, the anolyte 102 can include a liquid electrolyte solution to the electrochemical cell 110.

Figure 2:
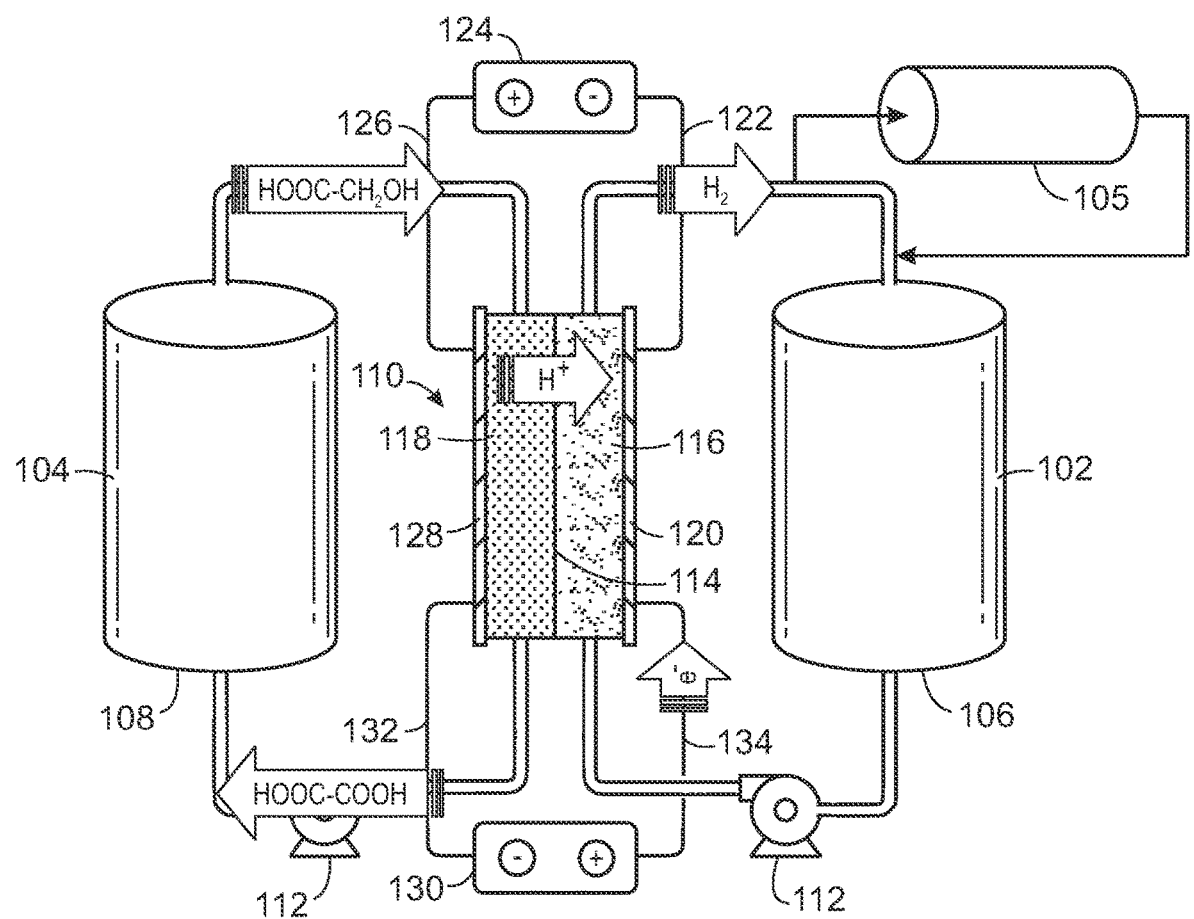
FIG. 2 shows an example reaction schematic of an oxalic acid/hydrogen gas flow battery during charging.

In some implementations, the catholyte 104 is oxalic acid and the anolyte 102 is hydrogen gas dissolved in electrolyte solution. FIG. 2 shows an example reaction schematic of an oxalic acid/hydrogen gas flow battery 200 during charging. During a charge cycle, as power flows from the power source 130 into the anode collector 120, $H_2$ gas is generated via oxidation of the oxalic acid. In some implementations, the generated $H_2$ gas can be stored in a separate tank 105, which may be used as a surge tank, or pressure regulating tank. During the charge cycle, the oxalic acid (HOOC—$CH_2OH$) is oxidized to glycolic acid (HOOC—COOH). The half reactions of the oxidation and reduction reactions during a charging cycle are shown in Eq. 1 and 2.

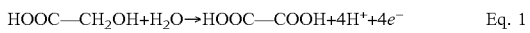

$$\text{HOOC—CH}_2\text{OH} + \text{H}_2\text{O} \rightarrow \text{HOOC—COOH} + 4\text{H}^+ + 4e^- \quad \text{Eq. 1}$$

$$4\text{H}^+ + 4e^- \rightarrow 2\text{H}_2 \quad \text{Eq. 2}$$

Figure 3:
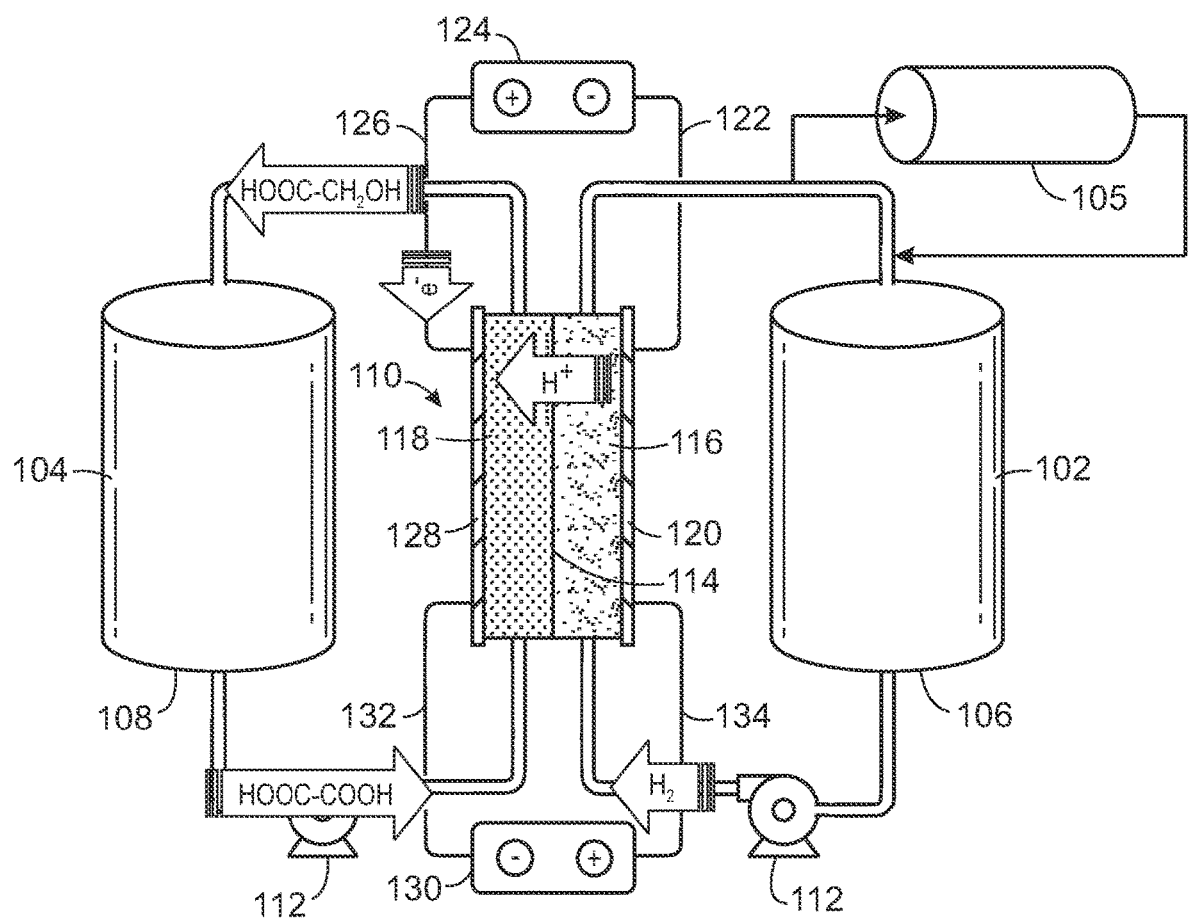
FIG. 3 shows an example reaction schematic of an oxalic acid/hydrogen gas flow battery during discharging.

FIG. 3 shows an example reaction schematic of an oxalic acid/hydrogen gas flow battery 200 during discharging. During a discharge cycle, $H_2$ is oxidized and energy is released. The $H_2$ reacts with glycolic acid and regenerates oxalic acid. In some implementations, all of the glycolic acid is regenerated to oxalic acid, restoring the battery to its initial stage. The half reactions of the oxidation and reduction reactions during a discharge cycle are shown in Eq. 3 and 4.

$$\text{HOOC—COOH} + 4\text{H}^+ + 4e^- \rightarrow \text{HOOC—CH}_2\text{OH} + \text{H}_2\text{O} \quad \text{Eq. 3}$$

$$2\text{H}_2 \rightarrow 4\text{H}^+ + 4e^- \quad \text{Eq. 4}$$

Advantageously, the electrolytes are not degraded during the charging or discharging process, which enhances the battery performance and increases the efficiency of the battery. Compared to other types of flow cells, these batteries reduce storage costs. Further, the batteries can be used for hydrogen gas storage. In addition, the ions that cross over between the two electrolytes are handled easily due to the two phases, gas and liquid, which allows for easy separations.

Figure 4:
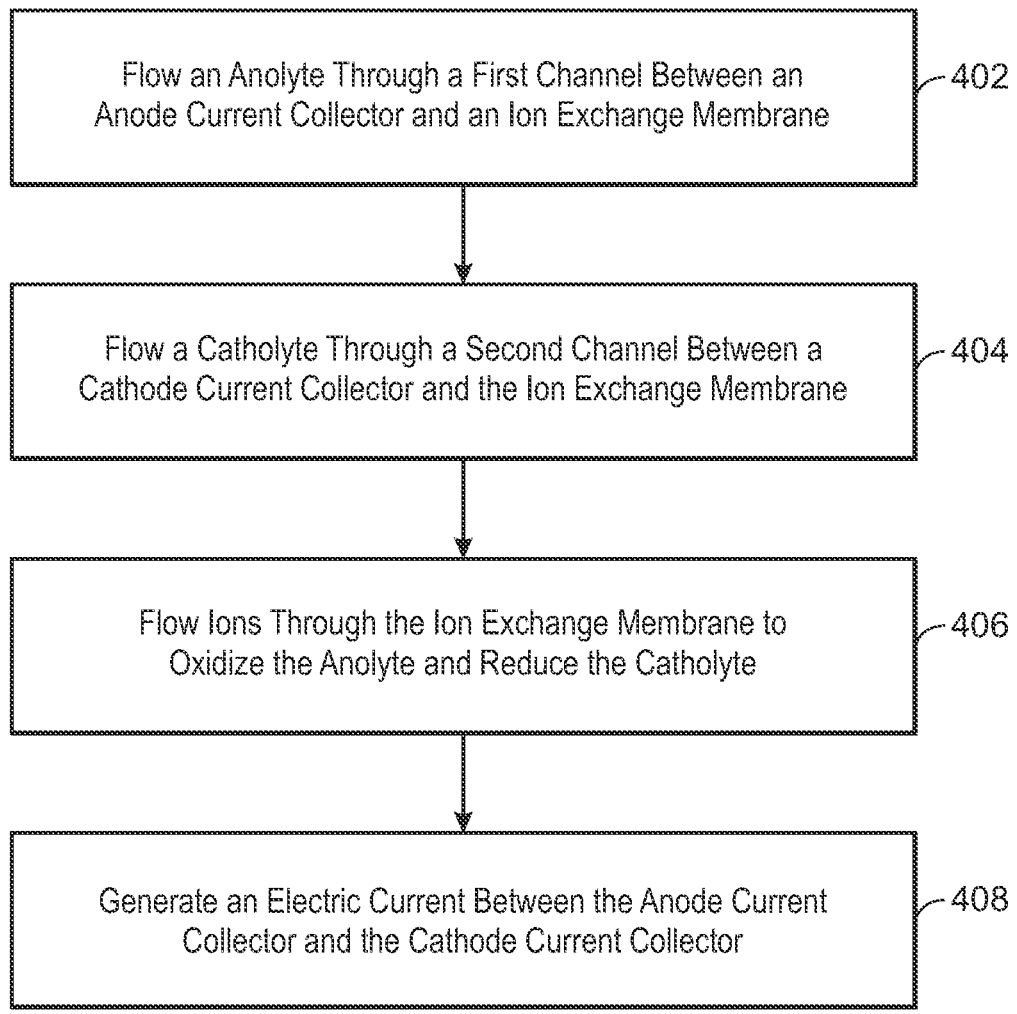
FIG. 4 is a flow chart of an example method of generating an electric current using an oxalic acid/hydrogen gas flow cell battery.

FIG. 4 is a flow chart of an example method 400 of generating an electric current using the oxalic acid/hydrogen gas flow cell battery. At 402, an anolyte is flowed through a first channel in an electrochemical cell. The first channel is formed in the space between an anode current collector and an ion exchange membrane. The anolyte includes hydrogen gas. At 404, a catholyte is flowed through a second channel in the electrochemical cell. The second channel is formed in the space between a cathode current collector and the ion exchange membrane. The first channel and the second channel are separated by an ion exchange membrane. The catholyte includes a compound that can be reversibly hydrogenated. At 406, ions are flowed through the ion exchange membrane to oxidize the anolyte and reduce the catholyte. At 408, an electric current is generated between the anode current collector and the cathode current collector.

In some implementations, the catholyte can be oxalic acid. In some implementations, the method further includes regenerating the anolyte and catholyte by applying an electric current from a power supply to the anode current collector and the cathode current collector.

In some implementations, a flow cell battery includes an electrochemical cell. The electrochemical cell includes an ion exchange membrane, an anode current collector, and a cathode current collector. The space between the ion exchange membrane and the anode current collector forms a first channel. The space between the ion exchange membrane and the cathode current collector forms a second channel. The ion exchange membrane is configured to allow ions to pass between the first channel and the second channel. The flow cell battery includes a first tank configured to flow an anolyte through the first channel, wherein the anolyte includes hydrogen gas. The flow cell battery includes a second tank configured to flow a catholyte through the second channel, wherein the catholyte includes a compound that can be reversibly hydrogenated and dehydrogenated.

This aspect, taken alone or combinable with any other aspect, can include the following features. The anolyte includes at least one of oxalic acid, a CO2 based compound, or a compound that can be reversibly hydrogenated/dehydrogenated, or any combination thereof.

This aspect, taken alone or combinable with any other aspect, can include the following features. The anolyte includes oxalic acid.

This aspect, taken alone or combinable with any other aspect, can include the following features. The flow cell battery includes a third tank in fluid communication with the first tank and configured to hold the hydrogen gas.

This aspect, taken alone or combinable with any other aspect, can include the following features. The anode current collector includes a carbon-based electrode.

This aspect, taken alone or combinable with any other aspect, can include the following features. The cathode current collector includes a carbon-based electrode.

This aspect, taken alone or combinable with any other aspect, can include the following features. The first channel includes a porous electrode material.

This aspect, taken alone or combinable with any other aspect, can include the following features. The porous electrode material includes felt or Rainey nickel.

This aspect, taken alone or combinable with any other aspect, can include the following features. The second channel includes a porous electrode material.

This aspect, taken alone or combinable with any other aspect, can include the following features. The porous electrode material includes felt or Rainey nickel.

This aspect, taken alone or combinable with any other aspect, can include the following features. The flow cell battery includes a load connected to the anode current collector and the cathode current collector.

This aspect, taken alone or combinable with any other aspect, can include the following features. The flow cell battery includes a power supply connected to the anode current collector and the cathode current collector.

This aspect, taken alone or combinable with any other aspect, can include the following features. The flow cell battery includes one or more pumps configured to pump the anolyte through the first channel and to pump the catholyte through the second channel.

In some implementations, a method of producing electric current includes flowing an anolyte through a first channel in an electrochemical cell. The first channel is formed in the space between an anode current collector and an ion exchange membrane. The anolyte includes hydrogen gas. The method includes flowing a catholyte through a second channel in the electrochemical cell. The second channel is formed in the space between a cathode current collector and the ion exchange membrane. The first channel and the second channel are separated by an ion exchange membrane. The catholyte includes a compound that can be reversibly hydrogenated. The method includes flowing ions through the ion exchange membrane to oxidize the anolyte and reduce the catholyte; and generating an electric current between the anode current collector and the cathode current collector.

This aspect, taken alone or combinable with any other aspect, can include the following features. The catholyte includes at least one of oxalic acid, a CO2 based compound, or a compound that can be reversibly hydrogenated/dehydrogenated, or any combination thereof.

This aspect, taken alone or combinable with any other aspect, can include the following features. The catholyte includes oxalic acid.

This aspect, taken alone or combinable with any other aspect, can include the following features. The method includes regenerating the anolyte and catholyte by applying an electric current from a power source to the anode current collector and the cathode current collector to reverse the oxidation of the anolyte and the reduction of the catholyte.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

A number of implementations of the disclosure have been described. Nevertheless, it will be understood that various modifications may be made without departing from the spirit and scope of the disclosure.

What is claimed is:

1. A flow cell battery, comprising:
   an electrochemical cell, wherein the electrochemical cell comprises
   an ion exchange membrane,
   an anode current collector, and
   a cathode current collector, wherein a space between the ion exchange membrane and the anode current collector forms a first channel, a space between the ion exchange membrane and the cathode current collector forms a second channel, and wherein the ion exchange membrane is configured to allow ions to pass between the first channel and the second channel;
   a first tank configured to flow an anolyte through the first channel, wherein the anolyte comprises hydrogen gas; and
   a second tank configured to flow a catholyte through the second channel, wherein the catholyte comprises a compound that can be reversibly hydrogenated and dehydrogenated,
   wherein the catholyte comprises oxalic acid.

2. The flow cell battery of claim 1, wherein the anolyte comprises at least one of oxalic acid, a $CO_2$ based compound, or a compound that can be reversibly hydrogenated/dehydrogenated, or any combination thereof.

3. The flow cell battery of claim 1, further comprising a third tank in fluid communication with the first tank and configured to hold the hydrogen gas.

4. The flow cell battery of claim 1, wherein the anode current collector comprises a carbon-based electrode.

5. The flow cell battery of claim 1, wherein the cathode current collector comprises a carbon-based electrode.

6. The flow cell battery of claim 1, wherein the first channel comprises a porous electrode material.

7. The flow cell battery of claim 6, wherein the porous electrode material comprises felt or Rainey nickel.

8. The flow cell battery of claim 1, wherein the second channel comprises a porous electrode material.

9. The flow cell battery of claim 8, wherein the porous electrode material comprises felt or Rainey nickel.

10. The flow cell battery of claim 1, further comprising a load connected to the anode current collector and the cathode current collector.

11. The flow cell battery of claim 1, further comprising a power supply connected to the anode current collector and the cathode current collector.

12. The flow cell battery of claim 1, further comprising one or more pumps configured to pump the anolyte through the first channel and to pump the catholyte through the second channel.

13. A method of producing electric current, comprising:
   flowing an anolyte through a first channel in an electrochemical cell, wherein the first channel is formed in a space between an anode current collector and an ion exchange membrane, wherein the anolyte comprises hydrogen gas;
   flowing a catholyte through a second channel in the electrochemical cell, wherein the second channel is formed in a space between a cathode current collector and the ion exchange membrane, wherein the first channel and the second channel are separated by an ion exchange membrane, and wherein the catholyte comprises a compound that can be reversibly hydrogenated;
   flowing ions through the ion exchange membrane to oxidize the anolyte and reduce the catholyte; and
   generating an electric current between the anode current collector and the cathode current collector,
   wherein the catholyte comprises oxalic acid.

14. The method of claim 13, wherein the catholyte comprises at least one of oxalic acid, a $CO_2$ based compound, or a compound that can be reversibly hydrogenated/dehydrogenated, or any combination thereof.

15. The method of claim 13, further comprising regenerating the anolyte and catholyte by applying an electric current from a power source to the anode current collector and the cathode current collector to reverse oxidation of the anolyte and reduction of the catholyte.

\* \* \* \* \*

UNITED STATES PATENT AND TRADEMARK OFFICE
CERTIFICATE OF CORRECTION

| | |
|---|---|
| PATENT NO. | : 11,682,785 B1 |
| APPLICATION NO. | : 17/577569 |
| DATED | : June 20, 2023 |
| INVENTOR(S) | : Ahmad D. Hammad, Issam T. Amr and Wajdi Issam Al Sadat |

It is certified that error appears in the above-identified patent and that said Letters Patent is hereby corrected as shown below:

In the Specification

In Column 2, Line 65, please replace "Rainey" with -- Raney --.
In Column 4, Line 61, please replace "Rainey" with -- Raney --.
In Column 4, Line 67, please replace "Rainey" with -- Raney --.

In the Claims

In Column 6, Line 33, Claim 7, please replace "Rainey" with -- Raney --.
In Column 6, Line 37, Claim 9, please replace "Rainey" with -- Raney --.

Signed and Sealed this
Fifth Day of November, 2024

Katherine Kelly Vidal
*Director of the United States Patent and Trademark Office*